Dec. 5, 1967   E. F. COX   3,355,991
METHOD AND APPARATUS FOR CONDITIONING WELDED RAIL JOINTS
Filed Sept. 30, 1965   4 Sheets-Sheet 1
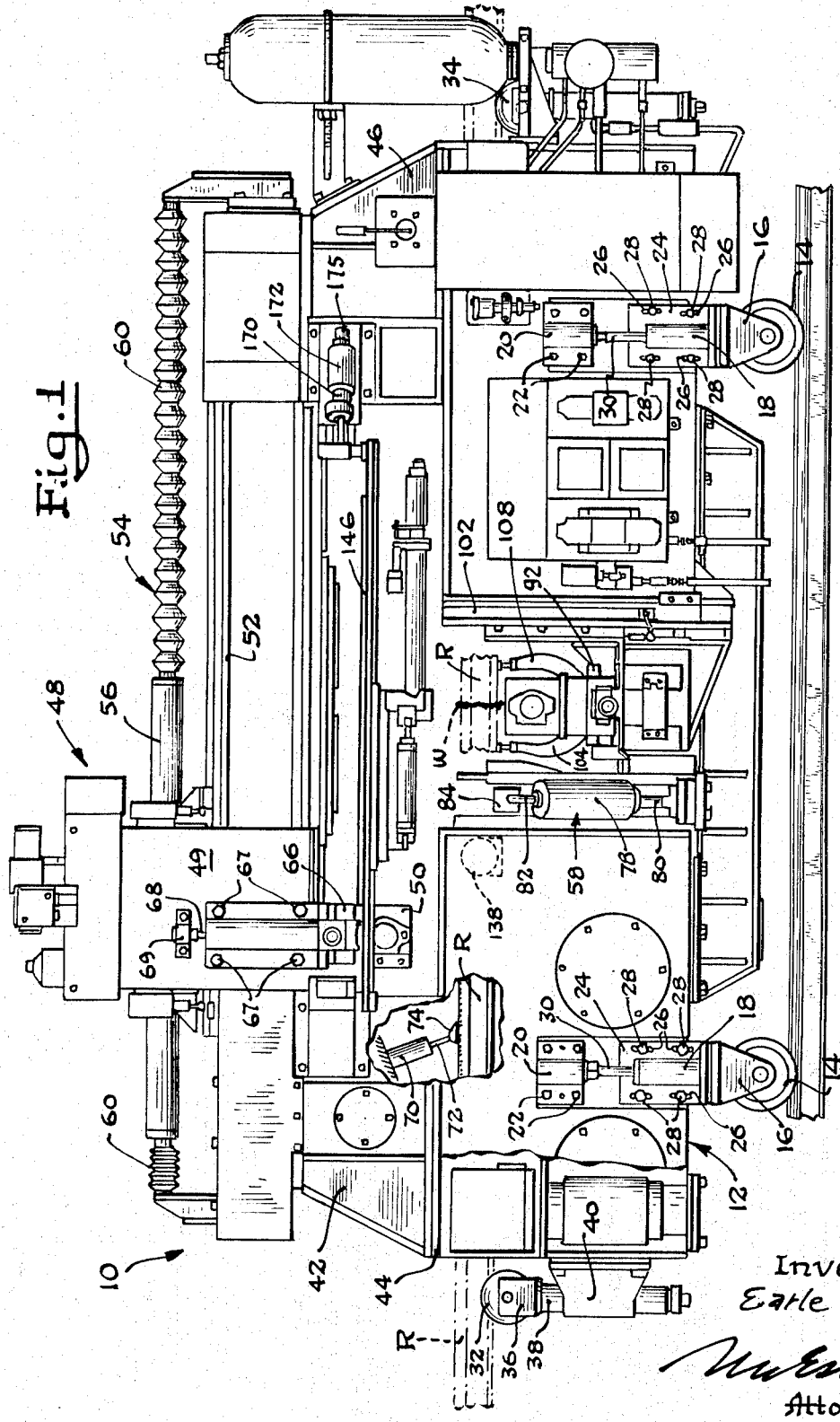
Inventor
Earle F. Cox
Attorney

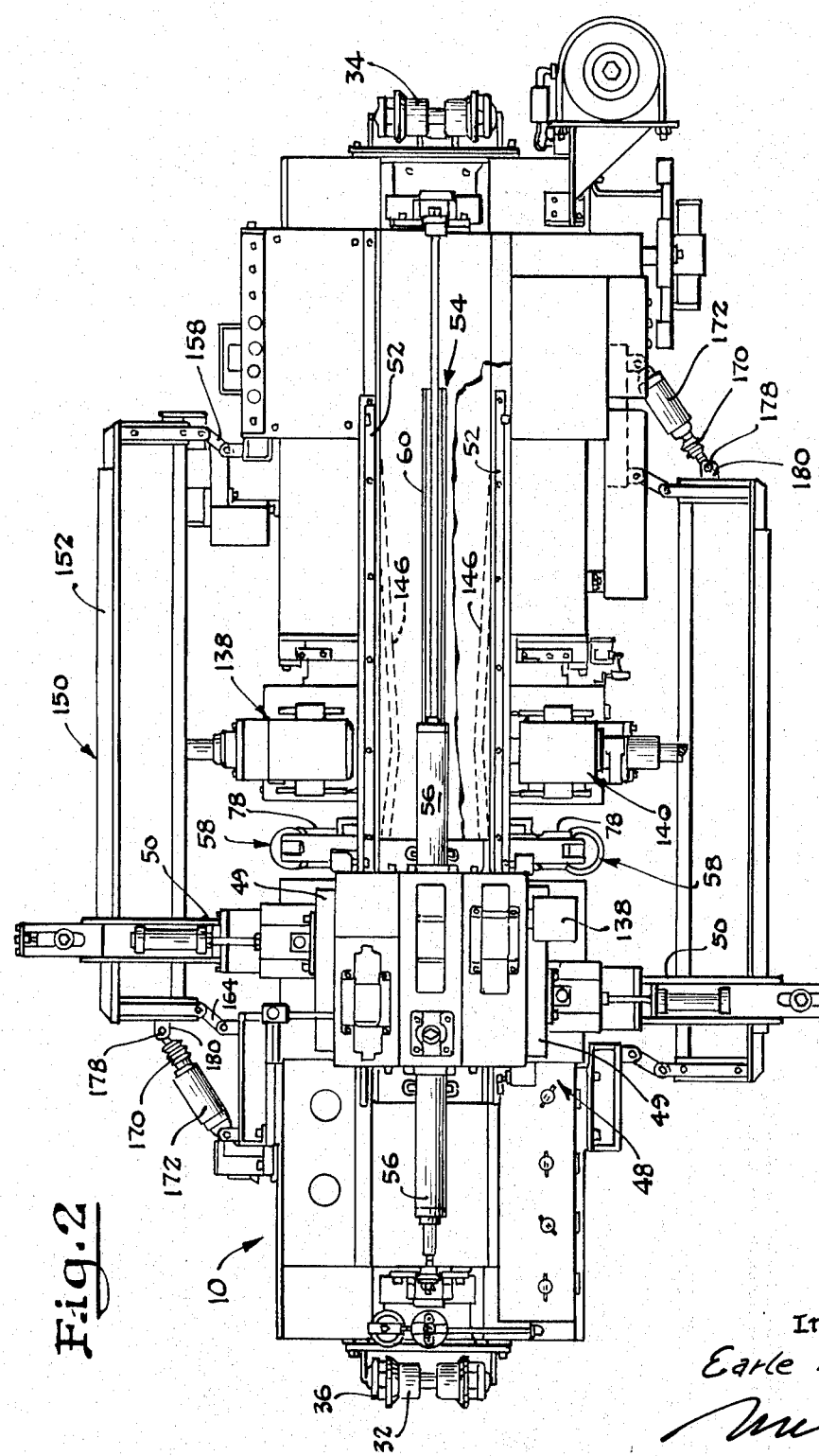

Dec. 5, 1967  E. F. COX  3,355,991
METHOD AND APPARATUS FOR CONDITIONING WELDED RAIL JOINTS
Filed Sept. 30, 1965  4 Sheets-Sheet 3
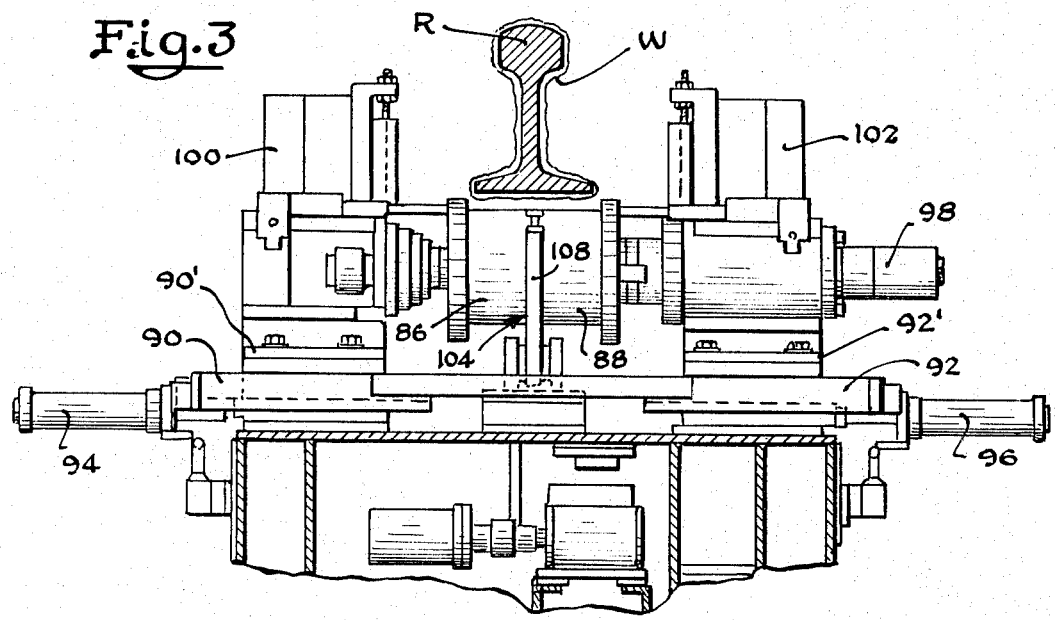
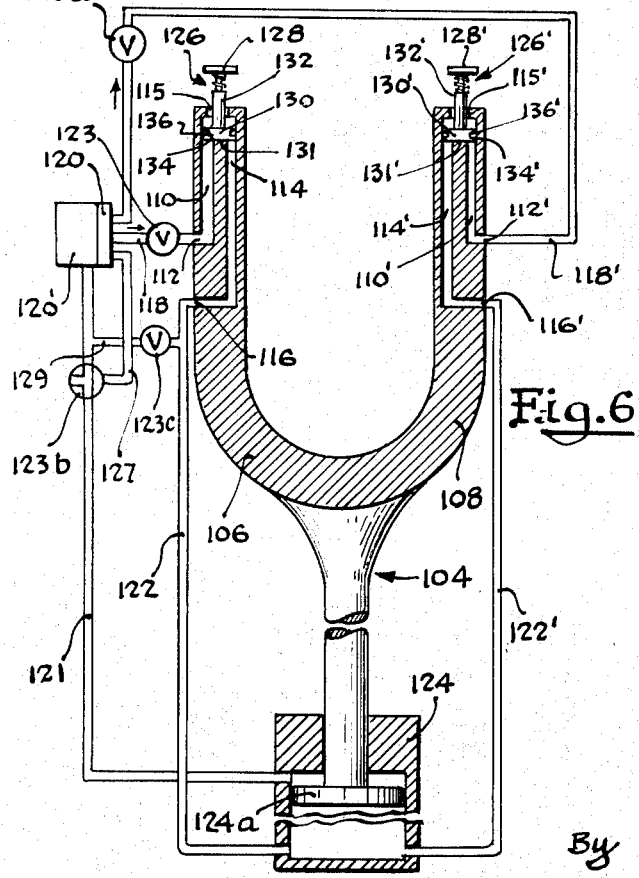
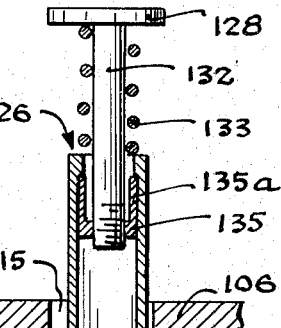
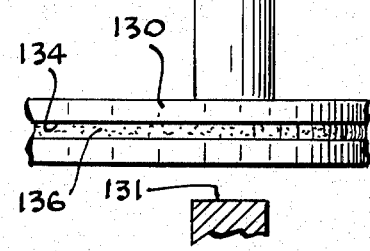
Inventor
Earle F. Cox
By
Attorney

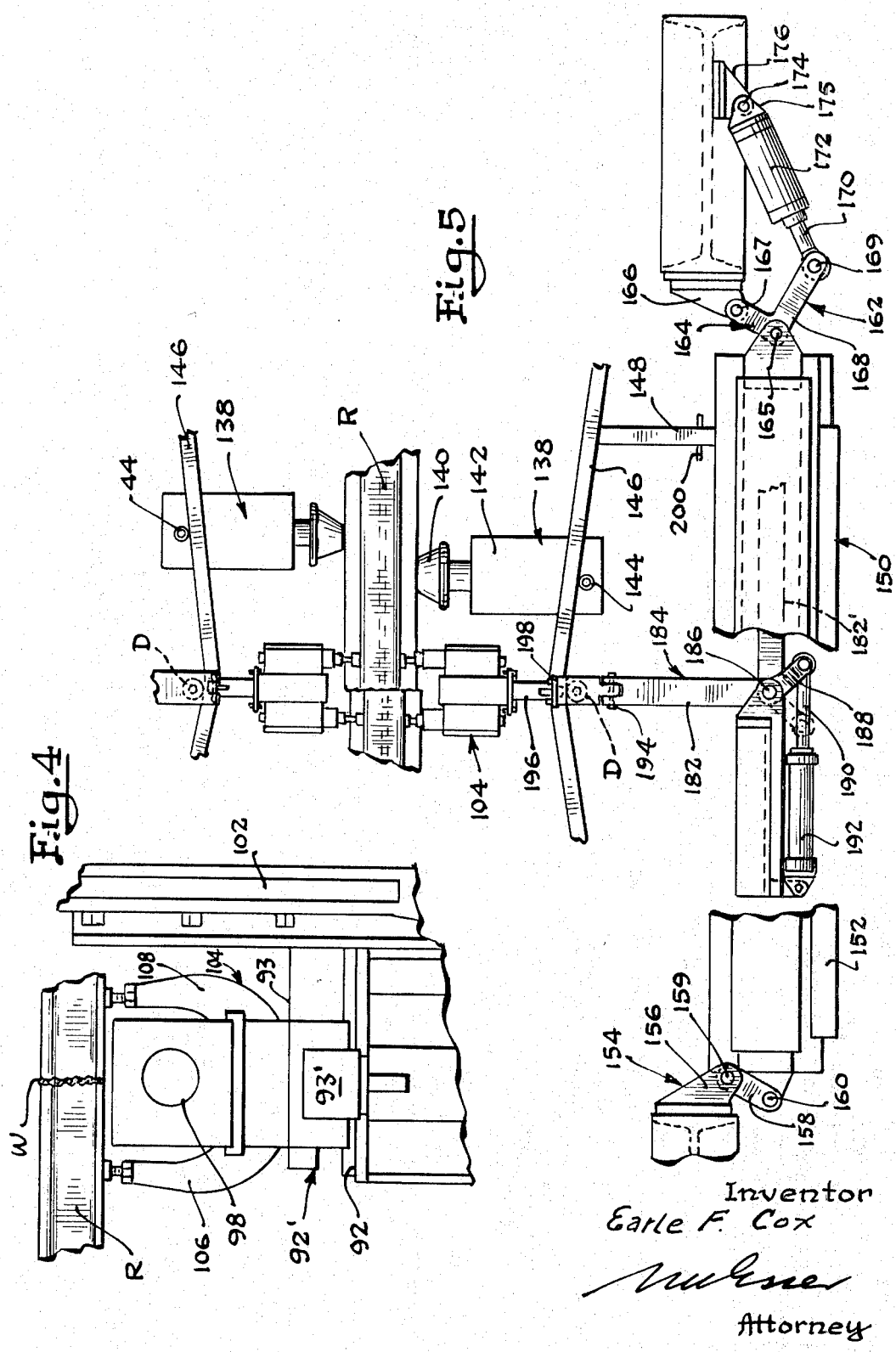

United States Patent Office 3,355,991
Patented Dec. 5, 1967

3,355,991
METHOD AND APPARATUS FOR CONDITIONING WELDED RAIL JOINTS
Earle F. Cox, Birmingham, Mich., assignor to Chemetron Corporation, Chicago, Ill., a corporation of Delaware
Filed Sept. 30, 1965, Ser. No. 491,570
2 Claims. (Cl. 90—24)

ABSTRACT OF THE DISCLOSURE

Apparatus having metal removing means and positioning means for guiding the movement of the metal removing means disposed on opposite sides and adjacent the top and bottom of a welded rail joint for providing a smooth transition between adjacent rail sections.

---

This invention relates to method and apparatus for conditioning welded rail joints and more particularly to method and apparatus for conditioning rail joints by removal of not only weld flash at the rail joint but also metal from one or both rail sections adjacent the weld flash to provide a smooth blended transition between the adjacent rail sections.

The method of the invention involves sensing, in particular probing or feeling, adjacent sections at both sides of the welded flash on both sides of the rail in order to properly remove excess metal at the weld zone. Metal removing means disposed on opposite sides of the rail travel along paths toward one rail head near both sides of the rail joint on both sides of the rail. Metal removing means disposed on each side of the rail can travel along paths toward one rail head near the weld flash at the rail joint, through the rail flash, and thereafter along paths away from the rail joint and away from the other rail head. The path of travel of each head metal removing means depends upon the determination made by sensing mentioned above. More particularly, taking the situation where the head of one rail section is offset with respect to the head of the adjacent rail, determination is made as to which rail section is offset the greater distance from the metal removal means on one side of the rail. The determination dictates the paths of travel of the metal removal means both toward and away from the rail joint. When these paths have been determined, the metal removing means is caused to skim across the surface of the rail section which is offset the greater distance. As the flash at the joinder of the adjacent rail sections extends outwardly beyond the head of each of the adjacent rail sections the rail flash in the path of travel of the metal removing means is also removed. The path of travel of the head metal removing means extends to the rail section which is offset the greater distance from the head metal removing means in its initial position, and the side of the head of the rail section which is offset the lesser amount is trimmed. The same sequence of steps is simultaneously followed on the other side of the rail so that the head of the rail is completely trimmed to provide smooth blended transition between adjacent rail sections.

Taking the situation where the base of one rail section is offset with respect to the base of the adjacent rail, determination is made as to which rail base is offset the greater distance from the metal removing means initially positioned below the rail base. The determination dictates the paths of travel of the base metal removing means toward and away from the rail joint. The path is so located that the base metal removing means skims across the lower surface of the rail base which is offset the greater distance from the rail in its initial position. As the flash at the joinder of the adjacent rail sections extends downwardly below the lower surface of the bases of the rail sections, the weld flash in the path of travel of the metal removing means is also removed. The path of travel of the base metal removing means extends to the rail section which is offset the greater distance from the base metal removing means in its initial position. The rail base which is offset the lesser amount is trimmed near the joint to provide a smooth blended transition between adjacent rail sections.

Apparatus for practicing the method of the invention is described hereinafter in greater detail and is shown in the accompanying drawings, in which:

FIGURE 1 is a side elevational view of the welded rail joint conditioning machine of the invention;

FIGURE 2 is a top view of the machine illustrated in FIGURE 1;

FIGURE 3 is a sectional view taken along lines 3—3 of FIGURE 2 illustrating the positioning of the rail joint area within the conditioning machine of the present invention;

FIGURE 4 is a view of the vertical position sensing means of the present invention;

FIGURE 5 is a fragmentary top view showing in particular how one of the conditioning means can be guided into and out of rail conditioning position;

FIGURE 6 is an enlarged fragmentary schematic view of one probe of the apparatus of the present invention; and FIGURE 7 is a view of a position sensing means of the rail conditioning machine.

As noted hereinabove, the present trend in the laying of railroad rail involves the use of longer rail sections. This not only results in faster laying of the rails but also gives rise to operating economics due to the significantly lower number of rail joints.

The most widely accepted form of welding rail sections into longer lengths today involves the application of electrical energy and pressure to the rail ends to be joined. The electrical energy applied to the rail ends is dissipated in the rail in the form of heat thereby heating the rail ends to be joined.

When two rail ends are joined with heat and pressure, as noted above, some of the weldment "flashes" radially outwardly of the outer periphery of the rail. Accordingly, the welded area must be conditioned prior to use by removal of the weld flash and by conditioning the offset, if any, so that a smooth finished section of the welded sections is provided extending from one rail section to the next. The rail preferably is conditioned immediately after welding. This, of course, involves conditioning of the rail while it still is hot. Conditioning of the welded joint area involves a process that must be controlled within limits to provide an acceptable finished area. It can readily be seen that the rail sections that are joined will be heated to a plastic state only in the area immediately in and adjoining the interfacial weld area, the remainder of the rail sections remaining relatively cool.

To provide uniform finishing characteristics the welded rail length should be flexed to define a preselected arc or degree of curvature as disclosed in copending U.S. patent application Ser. No. 308,539, filed Sept. 12, 1963, now Patent No. 3,230,832.

Another step in the process of rail conditioning involves flash removal and rail conditioning along the rail sides, which includes the web, and the underside of the base or base plate of the rail. This step in the procedure involves positioning of the flash removal and rail conditioning means with respect to the rail rather than positioning of the rail with respect to the flash removal and rail conditioning apparatus as in conditioning of the rail heads. It should be observed, of course, that the web and sides of the base portions of the joined rail sections may be conditioned in the same manner as that defined for the rail heads wherein the rail is positioned with respect to a fixed path of rail conditioning means. However, for optimum operation a process that involves conditioning of all surfaces of weld area at the same time is most desirable. Since the rail head is positioned with respect to a fixed path, then the sides and bottom of the rail must be conditioned with some other method by positioning of rail conditioners with respect to the rail.

Referring more particularly now to FIGURE 1 of the drawings, a rail conditioning machine is indicated generally at 10. The machine 10 includes a support frame or bed 12 having structural support for the elements included within the weld flash removal machine. A plurality of track wheels 14 are secured to the bed 12 of the machine 10 by wheel mounting members 16. Each of the wheel mounting members comprises a lower movable member 18 and an upper member 20 which is rigid with respect to the bed 12 of the machine 10. The member 20 is bolted to the bed 12 with a plurality of bolts 22. The lower movable portion 18 of the wheel mounting member 16 is bolted to the plate 24 of the wheel mounting members 16, which plate 24 is rigidly affixed to the bed 12 of the weld flash removal machine 10. The lower member 18 is provided with a plurality of elongated slot openings 26 extending therethrough, which openings are adapted to receive bolts 28 therein. The rigid member 20 and movable wheel mounting member 18 are interconnected by a threaded stem or member 30. It can readily be seen that the vertical positioning of the weld flash removal machine 10 may be adjusted with respect to the track upon which it is movably supported by rotating the threaded member 30 until the movable member 18 supporting the track wheels 14 is positioned properly. The movable member 18 then is rigidly attached to the plate 24 by tightly securing the member 18 with the bolts 28. The slots 26 permit convenient vertical positioning of the member 18 and thereby the wheels 14.

A pair of rail support rolls 32 and 34 are rotatably supported by the bed 12, one roll being positioned at either end of the bed 12. The roll 32 is pivotally mounted on support member 36 which member, in turn, is mounted to the cylinder 38. The cylinder 38 is rigidly affixed to the bed 12 by means of the bracket 40, which bracket is directly bolted to the bed of the machine 10. The roll 34 is affixed to the bed 12 through a cylinder of the same type mounting assembly as indicated for roll 32.

Each of the rolls 32 and 34 is vertically movable under direction of the position of the piston of the cylinder assembly 38 upon which the rolls are mounted. In this manner the weld rail sections to be welded may be raised or lowered in the butt flash welding machine to properly position them with respect to the flash removing means (described below) for removal of the flash and the offset portions (if any) occurring at the welded rail joint.

A fixed head 42, illustrated at the left of the weld flash removal machine in FIGURE 1, is positioned on top of the bed 12 and is rigidly affixed thereto. The general construction of the fixed head and various other features of the weld flash removal machine 10 illustrated herein, are described in greater detail in copending application Ser. No. 191,949, filed in the United States Patent Office on May 2, 1962, and now Patent No. 3,204,079.

A carriage, indicated generally at 48, includes a pair of traversing ways 52 supported between support members to provide support and guide means for movement of the carriage 48 longitudinally of the machinet 10.

A cylinder assembly 54 is operatively associated with the movable carriage 48 and is adapted to urge the carriage along the ways 52 of the machine 10. The cylinder assembly 54 is hydraulically operated. The central cylinder housing 56 houses the cylinder head (not shown) and the piston extends along the machine 10 for the full effective length of travel of the carriage 48. A suitable hydraulic fluid may be introduced behind one side of the piston head within the central housing 56 of the cylinder assembly 54 to thereby urge the head, and the carriage 48 which is operatively affixed thereto, along the length of the piston rod. The top cutters and carriage mechanism are described in detail in the above noted copending application. The apparatus of FIGURE 1 illustrates propelling means for the carriage 48 wherein extensible bellows members 60 are disposed about exposed portions of the piston rod (not shown) of the cylinder assembly 54 to protect the rod from dust or abrasive particles in the atmosphere. It can readily be seen that the abrasive particles would scratch the surface of the rod to give rise to a condition where the sealing members, disposed between the cylinder head and the piston rod, may tear and affect the air or fluid seal therebetween.

Support means 66 are bolted to the carriage frame by bolts 67. Vertical positioning mounting means including the adjusting rod 68 are provided in fixed relation to the carriage frame 49 to vary the vertical orientation of the upper cutters 50 with respect to the machine and the rails to be conditioned therein. It can readily be seen that the rod 68, for example, may be a threaded support stem adjustably received in a mating threaded member 69 to provide convenient means for varying the vertical position of the cutters 50. Provision is made for independent adjustment of the vertical position of the cutters 50 to compensate for cutter wear.

The carriage 48 and frame 49 are moved along the rails 52 during operation of the machine to move the metal removal means along the rail. The metal removal means (hereinafter referred to as "cutters"), once vertically adjustably positioned, are moved across the rail head in a predetermined plane of horizontal movement. The rail, therefore must be finally positioned with respect to the upper cutters 50 so that only the weld flash and, at most, a small portion of the rail head is removed during the weld flash removal operation.

It should be noted that the rail R comes to the weld flash conditioning machine 10 while still hot from the joint welding operation. The rail joint area, of course, has expanded due to its heated condition while the remainder of the rail along either side of the joint (slightly spaced therefrom due to dissemination of heat along the rail from the rail joint) is relatively cold. The degree of curvature of the rail joint is roughly predictable but not precisely so. Accordingly, the weld flash removal machine must be provided with means to position the rail therein along a predetermined line of curvature so that the cutters will approach the rail in the proper area and will be in position to remove the weld flash from the rail joint.

The rail R is fed from the welding stage of the operation to the weld flash removal apparatus 10 and moves into said apparatus over the support roller 32, along through the apparatus and is supported at the opposite end by the support roller 34. The rail R, as noted above, may be curved to any degree of curvature within a desired range of curvatures and to that extent must be clamped within the machine to a predetermined degree of curvature. The machine 10 is provided with means to impart a coupling force upon the rail at either end of the machine and spaced from the rail joint to force the rail into the desired line of curvature. Normally the rail joint area will be curved to a greater degree than the desired degree of curvature for optimum conditioning within the weld flash removal apparatus. When the curved rail is received within the machine it initially is supported upon the rollers 32 and 34. A pair of cylinders, as at 70, are positioned inboard of the support rollers 32 and 34 and in spaced relation to the rail joint. Hydraulic cylinders 70, at either end of the machine 10, are provided with a rod 72 with a shoe 74 at the free terminal thereof. The shoes 74 are brought down on the head of the rail R. As described in greater detail in application Ser. No. 191,949 (noted above), the shoes 74 are brought down against the rail head to exert the downward force against the rail. The rollers 32 and 34 are moved up against the base of the rail R to exert an upward force against the rail outboard the point of application of force of the shoe 74, the combination of forces exerting a coupling force upon the rail tending to move it to a lesser degree of curvature along the length and in a vertical plane between the clamping members. The rail is moved in this manner substantially to the desired degree of curvature and within a range of curvature convenient for the small cutter adjustments that may be provided.

The side cutters for the rail joint area and the bottom cutters, however, must be repositioned for each operation. It should be noted that the primary consideration during the welding operation is to mate the rail heads so that they are in registration and when welded will provide a smooth rail joint—at least at the head. However, during the butt welding operation the rails are moved toward each other with substantial forces and many times some offset of one rail with respect to the other will occur. It generally is difficult to maintain the rail ends in precise abutting relation due to the character of the joining operation. In view of the particular attention to positioning of at least the rail head so that the mating ends are in registration during welding, rail offset generally is not too great. Some offset may occur, however, and the cutters must be adjustable, even with the careful rail positioning of the rail within the weld flash removal apparatus to compensate for this rail offset. The top cutters 50, of course, are brought across the rail head in a predetermined path which is adjusted only so that it will intersect the apex of the curved rail joint area and will remove the weld flash and base metal to provide the desired smooth, finished rail joint. The side cutters and the bottom cutters, however, must be moved a substantial distance away from the rail during each operation and therefore careful positioning means must be provided to properly orient the bottom and side cutters with respect to the rail during each conditioning operation. The apparatus of the present invention is provided with rail position sensing means and cutter guide positioning means for proper orientation of the side and bottom cutters with respect to the rail joint area W. Another consideration for proper orientation of the bottom and side cutters arises when offset occurs, that is, when the abutting rail ends are not in registration. In this case if the cutters do not move along the welded rail joint W in the proper path the weld flash may not be completely removed or the cutters may remove too much metal from the rail itself and weaken it at the joint area due to reduced cross-sectional area.

As seen in FIGURE 3, the bottom cutters 86 and 88 move into abutting axially aligned relation during use along slideways 90 and 92 on supports 90′ and 92′, respectively. The hydraulic cylinder members 94 and 96 are provided to move the cutters 86 and 88 toward and away from each other. The split lower or bottom cutting members permit modest cutter movement to bring the cutters fully away from the rail path through the machine 10. Each of the bottom cutters 86 and 88 may be driven by a drive motor, as at 98. The cutters 86 and 88 may be positively engaged at their abutting faces to provide drive means therebetween and to permit the use of only one drive motor, as shown. The bottom cutters 86 and 88 are moved vertically on supports 93 (FIGURE 4) along slideways 100 and 102, respectively, and are positioned vertically in response to rail position in the machine and in response to rail offset. The guide or support 93, for example, is received in slideway 102 and the cutter assembly moved by a worm drive or other auxiliary drive means 93′ for vertical positioning along its related slideway.

The bottom cutters 86 and 88 are moved into cutting relation with the rail R in response to the probe positioning means 104. Probe means 104 defines a pair of sensing arms 106 and 108. The spaced arms 106 and 108 are disposed one along each side of the cutters 86 and 88 when said cutters are in operative position. As seen more clearly in FIGURE 6, each probe arm 106 and 108 is provided with a fluid conduit 110 and 110′, respectively. Conduit 110 extends from port 112 into an open central cavity 114, provided with a vent 115 and then to port 116. A flexible conduit 118 is connected at one end to the port 112 of conduit 110 and at the other end to a fluid supply, indicated schematically at 120. A second flexible conduit 122 is connected at one end to the port 116 of conduit 110 in arm 106 and at the other end to the supply port of the cylinder 124. A position sensing member indicated generally at 126 is shown to include a feeler head 128 and a closure member 130 interconnected by a tubular member 132 and a rod 132′ received by the tubular member 132. A spring 133 encircles the rod 132 and bears at one end against the feeler head 128 and at the other end against the end of the tubular member 132. The closure member 130 is provided with an annular groove 134 along the circumferential wall thereof within which an O-ring 136 is disposed. The rod 132′ is threadably adjustable relative to nut 135 which can move in the bore 135a. The O-ring is provided to define a fluid seal between the member 130 and the wall of the open central cavity 114. As the member 126 moves toward the base of the probe means it can readily be seen that the base of the closure member 130 will move into metal-to-metal contact with the terminal end 131 of the wall separating the halves of the conduit 110 between ports 112 and 116. The metal-to-metal seal will provide fluid sealing means to prevent leakage of fluid from the supply past this interface to conduit 112 and the cylinder 124. Leakage of fluid is prevented along any other surface by the O-ring 136 of the assembly. Thus a fluid tight seal will be defined when the closure member 130 is seated against the terminal end 131 of the central cavity 114. The conduit and closure assembly of the arm 108 of the probe means 104 are identical to that described in detail above for arm 106. Accordingly, all parts that are similar in function to those defined above are indicated with the same numbers with a prime (′) added after the number.

It is readily seen that with this probe means the fluid from the high pressure source 120 will continue to be fed to the cylinder 124 as long as one member 126 or 126′ is not fully seated. When member 126, for example, is fully seated and defines a fluid-tight seal to prevent fluid flow, the valves 126′ may still be away from its seated position in which case fluid would continue to flow from the high pressure source 120 through conduits 118′, 110′, and conduit 122′ and to the cylinder 124 to continue operation of the cylinder to continue to move the probe toward the rail R. A fluid bleed line 121 connects the cylinder 124 at one side of the piston 124a to a sump 120′. Conduits 118, 118′ and 121 contain valves 123, 123a and 123b. A conduit 127 is connected to the source and to the valve 123b. A conduit containing a valve 123c connects the conduit 121 and 122. When it is desired to move the probe means away from the rail the valves 123, 123a are closed and the valve 123c is opened. The valve 123b is positioned so that high pressure fluid can pass from the source 120 through the conduit 127 and the conduit 121 to the cylinder 124 to drive the piston 124a and hence the probe means 104 away from the rail. Because valve 123c is open, the portion of the cylinder below the piston 124a in FIGURE 6 can be easily vented to the sump 210′, as the piston is being driven downwardly (FIGURE 6). Cylinder 124 of the assembly moves both the probe means 104 and the bottom cutters 86 and 88 up toward the rail R in unison.

The same hydraulic circuit as described in the foregoing paragraph is provided for each side probe means 104 and for the bottom probe means 104 except that the source 120 and the sump 120′ can be common.

The rail conditioning machine 10 of the invention, in addition to having top and bottom cutters, is provided with side conditioning means to remove weld flash from the rail sides and to condition the weld joint to provide a smooth transition from one rail end to the abutting welded rail end in the welded joint area W.

One side cutter is positioned along each side of the rail path through the conditioning machine, as at 138, FIGURES 1 and 2. A cutter is provided in opposed relation to cutter 138 to condition the opposite side of the rail R. The operation of the conditioning machine 10 of the type noted herein and particularly details of construction and of operation of the side cutters and associated assembly are set forth in copending U.S. patent application Ser. No. 191,949, filed May 2, 1962, and now Patent No. 3,204,079. As seen in FIGURE 5 of that patent application the cutter 138 (and the opposed cutter for conditioning the other rail side) is provided with a grinding head 140 adapted to be received within the side recess of the rail R with the flange thereof adapted to extend over the edge of the rail base, all as set forth in the above noted copending application. The grinding head 140 is driven by a motor 142 connected to a suitable power source (not shown). The cutter 138 is provided with a cam follower 144. The cam follower 144 of each rail cutter is adapted to be guidingly moved along angled cam tracks 146.

The cam track is supported by brackets 148 extending from retractable cam track positioning means, indicated generally at 150. The positioning means 150 includes a support frame 152 which is pivotally mounted at one end by linkage 154. The linkage 154 is defined by bracket 156 affixed to the machine frame. A link arm 158 is pivotally mounted to the bracket 156 by pin 159. The other end of the arm 158 is pivotally mounted to the frame 152 by pin 160. The other end of the frame 152 is pivotally mounted to the frame of the machine and to a primary position control cylinder by the linkage indicated generally at 162. Linkage 162 includes a bell crank 164 connected at one end to the frame 152 by pin 165. The other end of the bell crank 164 pivotally mounted to the machine frame bracket 166 by pin 167. A second link arm 168 is pivotally mounted to the frame 152 by pin 165 in a common mount with one end of the bell crank 164. The opposite end of link arm 168 is pivotally affixed to the free end of the piston 170 of the cylinder 172 by pin 169. The cylinder 172 is pivotally affixed to the frame of the conditioning machine by pin 174 which extends through mating portions of the cylinder mounting bracket 175 and the machine frame bracket 176. The above cylinder mounting and operating construction is shown in detail in FIGURE 5 of the drawings. Another arrangement to accomplish the same function is shown in FIGURE 2 of the drawings wherein the frame 152 is pivotally mounted to the machine frame through the links 158 and 164, as in the structure of FIGURE 5. However, the piston 170 of the cylinder 172 is directly pivotally mounted to the frame 152 by pin 178 associated with bracket 180 which is rigidly affixed to said frame. The operation of the retractable positioning means 150 is similar regardless of the specific form of mounting as shown in FIGURES 2 and 5. The cam guide tracks 146 are primarily positioned with respect to the conditioning machine by extension of the piston 170 of cylinder 172.

Liquid is admitted to the cylinder 172 to move the piston 170 to a position extended from the cylinder 172 and to urge the free end thereof away from the cylinder. The free end of the cylinder, in turn, moves the positioning frame member 152 clockwise, as seen in FIGURE 5 of the drawings, about its spaced pivot points as defined by pins 159 and 167 to move said frame 152 towards the rail path defined through the conditioning machine.

The probes 104 are brought from their rest positions through 90° arcs into perpendicular position relative to the rail. One feeler head 128 of each probe must clear the rail weld flash W. Cylinder 124 is actuated to move respective probes 104 toward the rail head. When the probes 104 are positioned so that the heads 128 are near the rail head, cylinder 124 is deactuated and valve 123 is opened, the valve 123b being in the position shown in FIGURE 6 and the valve 123c being in the closed position. When closure members 130 and 130' are seated against respective seats 131 and 131', the forward movement of the arms 106 and 108 of the probe 104 is interrupted. The roller D thus ceases to move the cam 146 which is in position to guide the roller 144.

The probe head 104 for the positioning means for the side cutters is mounted on one arm 182 of crank arm 184. The crank arm is pivotally mounted to the frame 152 at 186. The other arm 188 of the crank arm 184 terminates in a free end to which is pivotally mounted the free end of the piston 190 of cylinder 192. The cylinder 192 is rigidly affixed to the frame 152, as illustrated generally in FIGURE 5 of the drawings.

When the piston 190 is withdrawn into the cylinder arm 188 of crank arm 184 is moved to its first position nearest the cylinder 192 and the arm 182 to which the probe 104 is affixed is rotated to a position indicated at 182' of FIGURE 5 and substantially longitudinally aligned with the frame 152 of the apparatus. When the probe 104 is to be moved to operative position the piston 190 is moved to its extended position, the absolute distance of movement of said piston being sufficient to rotate the arm 188 through a 90° arc with respect to its pivot 186. The arm 182 of crank arm 184 also is rotated through 90° to bring the probe into a position perpendicular to the rail path defined through the conditioning machine. The probe 104 may be brought to its operative position either before or after primary positioning of the frame 152 and therethrough of the cam guide tracks 146. Preferably the probe will be moved to operative position prior to primary positioning of the frame 152 since it will be simpler to clear adjacent portions of the conditioning machine.

The crank arm 182 of the secondary positioning means can include a hinge 194 with a cam track engaging bracket 198 having a roller D. The hinge 194 enables the probe 104 to clear the cutter 138 when the cylinder 192 is actuated. When the primary positions of the frame 152 and tracks 146 are realized through operation of the cylinder 172 the secondary positioning means, or probe 104, is energized. As seen in FIGURE 5 with the rail in the machine the probe, of course, will move toward contact with the welded rail joint with one position sensing member 126 or 126' being positioned on either side of the weld joint. As the probe 104 moves toward the rail, the roll D engages and carries the tracks 146 and frame 152 therewith to move the retractable guide assembly close to the rail R. When both closures 130 are seated agtinst respective seats 131, flow of fluid to the cylinder 124 is terminated and the guide cam rails 146 are in position to guide the cutter heads 140 of the side cutters 138 across the welded rail joint area to trim the flash therefrom and to provide a smoothly tapering finished rail joint area upon cooling of the rail.

The probe head 104 is, of course, retracted to position 182' prior to grinding of the welded joint area. Suitable clamp means, such as represented by the clamp 200, may be provided to fix the position of the guide rails 146 once they are preferentially positioned by the secondary positioning means of the apparatus.

Other embodiments and modifications of this invention will suggest themselves to those skilled in the art, and all such of these as come within the spirit of this invention are included within its scope as best defined by the appended claims.

I claim:

1. In combination in a rail joint conditioning machine: a support bed to receive rails, means for cambering the rail to a predetermined curvature, means movably mounted by said bed on opposite sides of the rail for removing metal from the head of the rail, said head metal removing means being angularly offset from each other along the length of the rail, means movably mounted by said bed below the base of the rail for removing metal from the base of the rail, said base metal removing means comprising a pair of axially aligned cutters, said aligned cutters being movable toward and away from each other for bringing the cutters fully into and away from the path of the rail, means for guiding said head metal removing means along angled paths toward and away from the rail joint so that each head metal removing means removes metal from the corresponding offset rail section to provide a smooth blended transition at the head of the rail at the joint, means for guiding said base metal removing means along angled paths toward and away from the base of the rail joint so that said base metal removing means removes metal from the offset rail section to provide a smooth blended transition at the base of the rail at the joint, means movable toward and away from the head of the rail at the rail joint for sensing the positions of adjacent rail sections at both sides of the rail head to determine the rail section which is offset the greater distance from said head metal removing means, means movable toward and away from the base of the rail at the rail joint for sensing the positions of adjacent rail sections at both sides of the rail joint to determine the rail section which is offset the greater distance from the base metal removing means, means controlled by said head sensing means for positioning said guiding means in accordance with the corresponding rail section which is offset the greater distance to enable the head metal removing means to provide a smooth blended transition between the adjacent sections at both sides of the rail, and means controlled by said base sensing means for positioning said base guiding means in accordance with the rail section which is offset the greater distance to enable said base metal removing means to provide a smooth blended transition between the adjacent sections at the base of the rail.

2. Method of conditioning welded rail joints, comprising the steps of: bringing a metal rail having rail sections joined at a common welded joint into approximate position with respect to means for removing metal from the base and head of the rail, curving the rail along a predetermined line of curvature, positioning the means for removing metal with respect to the line of curvature, probing a side of the rail head on both sides of the joint to determine which rail section is offset a greater amount with respect to the means for removing metal from the head of the rail, probing the rail base at both sides of the joint to determine which rail section is offset a greater amount with respect to the means for removing metal from the base of the rail, guiding each of the base and head metal removing means toward the rail in paths determined by probing, and thereafter moving each of the base and head metal removing means along paths away from the rail joint.

References Cited

UNITED STATES PATENTS 2,975,265   3/1961   Kaiser et al. _____ 90—24

WILLIAM W. DYER, Jr., *Primary Examiner.*

GERALD A. DOST, *Examiner.*